(12) United States Patent
Zhou et al.

(10) Patent No.: US 8,891,205 B2
(45) Date of Patent: Nov. 18, 2014

(54) APPARATUSES AND METHODS FOR CONTROLLING NEAR-FIELD TRANSDUCER TO WRITE POLE SPACING

(71) Applicant: Seagate Technology LLC, Cupertino, CA (US)

(72) Inventors: Hua Zhou, Plymouth, MN (US); Yongjun Zhao, Eden Prairie, MN (US); Chris Rea, Edina, MN (US); Werner Scholz, Edina, MN (US); James G. Wessel, Savage, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/864,201

(22) Filed: Apr. 16, 2013

(65) Prior Publication Data

US 2014/0307534 A1    Oct. 16, 2014

(51) Int. Cl.
   *G11B 5/60*    (2006.01)
(52) U.S. Cl.
   USPC ...................................................... 360/125.3
(58) Field of Classification Search
   USPC ...................................................... 360/125.3
   See application file for complete search history.

(56) References Cited

U.S. PATENT DOCUMENTS

| | | | |
|---|---|---|---|
| 8,164,855 B1 * | 4/2012 | Gibbons et al. | 360/125.74 |
| 8,289,650 B2 | 10/2012 | Seigler et al. | |
| 8,331,205 B2 | 12/2012 | Seigler et al. | |
| 8,345,374 B2 | 1/2013 | Sendur et al. | |
| 8,351,305 B2 | 1/2013 | Zhou et al. | |
| 8,405,932 B2 * | 3/2013 | Seigler et al. | 360/125.3 |
| 8,413,317 B1 * | 4/2013 | Wan et al. | 29/603.13 |
| 8,416,530 B2 * | 4/2013 | Gao et al. | 360/125.31 |
| 8,477,454 B2 * | 7/2013 | Zou et al. | 360/125.31 |
| 8,559,127 B2 * | 10/2013 | Gage et al. | 360/59 |
| 8,576,673 B2 * | 11/2013 | Ostrowski et al. | 369/13.33 |
| 8,607,439 B1 * | 12/2013 | Wang et al. | 29/603.16 |
| 8,634,280 B1 * | 1/2014 | Wang et al. | 369/13.33 |

(Continued)

FOREIGN PATENT DOCUMENTS

WO    WO2010103697    9/2010

OTHER PUBLICATIONS

International Search Report and Written Opinion dated Sep. 15, 2014 from International Application No. PCT/US2014/034137, 9 pages.

*Primary Examiner* — Mark Blouin
(74) *Attorney, Agent, or Firm* — Hollingsworth Davis, LLC (57) ABSTRACT

An apparatus is provided that includes a waveguide adjacent an air bearing surface, a near-field transducer comprising a peg having a side orthogonal to the air bearing surface and a write pole adjacent to the waveguide. The write pole includes a first portion extending towards the air bearing surface at a non-orthogonal angle with respect to the air bearing surface, and a second portion in contact with the first portion comprising a side that extends towards and orthogonally contacts the air bearing surface. The second portion or the write pole defines a gap between the side of the peg orthogonal to the air bearing surface and the side of the second portion of the write pole that extends towards and orthogonally contacts the air bearing surface. A method of making a magnetic recording head that includes the provided apparatus is also disclosed.

19 Claims, 12 Drawing Sheets

(56) References Cited

U.S. PATENT DOCUMENTS

| | | | |
|---|---|---|---|
| 8,670,215 B2 * | 3/2014 | Zou et al. .............. 360/125.31 |
| 2009/0073858 A1 | 3/2009 | Seigler et al. |
| 2009/0168220 A1 | 7/2009 | Komura et al. |
| 2010/0214685 A1 | 8/2010 | Seigler et al. |
| 2012/0039155 A1 | 2/2012 | Peng et al. |
| 2012/0163139 A1 | 6/2012 | Vavra et al. |
| 2012/0314547 A1 | 12/2012 | Seigler et al. |
| 2013/0003511 A1 | 1/2013 | Gao et al. |

* cited by examiner

APPARATUSES AND METHODS FOR CONTROLLING NEAR-FIELD TRANSDUCER TO WRITE POLE SPACING

BACKGROUND

In response to increased demand for higher magnetic storage capacity, areal bit densities approaching or greater than 1 Tb/in$^2$ are being contemplated. The bit size of sub 50 nm required to fulfill this goal is within a range where superparamagnetic instabilities affect the lifetime of stored data. Superparamagnetic instabilities become an issue as the grain volume of the recording media is reduced in order to increase the areal density of recorded information. The superparamagnetic effect is most evident when the grain volume V is sufficiently small such that the inequality $K_U V/k_B T > 70$ can no longer be maintained, where is the magnetocrystalline anisotropy energy density of the material, $k_B$ is Boltzmann's constant, and T is absolute temperature. When this inequality is not satisfied, thermal energy can demagnetize the stored bits. As the grain size is decreased in order to increase the areal density, a threshold is reached for a given and temperature T such that stable data storage is no longer feasible.

The thermal stability can be improved by employing a recording media formed of a material with a very high $K_u$. However, with available materials, recording heads are not able to provide a sufficient or high enough magnetic writing field to write on such a media. Accordingly, it has been proposed to overcome the recording head field limitations by employing thermal energy to heat a local area on the recording media before or at about the time of applying the magnetic field to write to the media in order to assist in the recording process.

Heat assisted magnetic recording (HAMR) generally refers to the concept of locally heating a recording media to reduce the coercivity. This allows the applied magnetic writing fields to more easily direct the magnetization during the temporary magnetic softening caused by the heat source. HAMR allows for the use of small grain media, with a larger magnetic anisotropy at room temperature to assure sufficient thermal stability, which is desirable for recording at increased areal densities. HAMR can be applied to any type of magnetic storage media including tilted media, longitudinal media, perpendicular media, and patterned media. By heating the media, the $K_u$ or coercivity is reduced such that the magnetic write field is sufficient to write to the media. Once the media cools to ambient temperature, the coercivity has a sufficiently high value to assure thermal stability of the recorded information.

For heat assisted magnetic recording, an electromagnetic wave of, for example, visible, infrared, or ultraviolet light can be directed onto a surface of a data storage media to raise the temperature of a localized area to facilitate switching. Well known optical waveguides such as solid immersion lenses (SILs), solid immersion mirrors (SIMs), and mode index lenses have been proposed for use in reducing the size of a spot on the media that is subjected to the electromagnetic radiation. Due to diffraction limited optical effects, SILs, SIMs, and mode index lenses alone are not sufficient to achieve focal spot sizes necessary for high areal density recording. Metal pins and other near field transducer (NFT) designs are positioned at the focal point of the waveguide and used to further concentrate the energy and direct it to a small spot on the surface of the recording media.

SUMMARY

Various embodiments disclosed herein are generally directed to apparatuses and methods for controlling near-field transducer to write pole spacing in write heads used in heat-assisted magnetic recording (HAMR). In one aspect, an apparatus is provided that includes a waveguide adjacent an air bearing surface, a near-field transducer comprising a peg having a side orthogonal to the air bearing surface and a write pole adjacent to the waveguide. The write pole includes a first portion extending towards the air bearing surface at a non-orthogonal angle with respect to the air bearing surface, and a second portion in contact with the first portion comprising a side that extends towards and orthogonally contacts the air bearing surface. The second portion or the write pole defines a gap between the side of the peg orthogonal to the air bearing surface and the side of the second portion of the write pole that extends towards and orthogonally contacts the air bearing surface.

In another aspect, a method of making a magnetic recording head is provided that includes patterning a near-field transducer peg and a near-field transducer disc on a substrate-parallel plane, depositing an insulating layer disposed on the substrate-parallel plane, planarizing a surface comprising the insulating layer, near-field transducer peg and near-field transducer disc, patterning a heat sink and an etch stop at least partially covering the surface, depositing a slope layer atop and in contact with the heat sink, etching the slope layer to produce a sloped heat sink, removing the etch stop, and patterning a write pole atop and in contact with the slope layer and insulating layer.

In the present disclosure:

"pattern deposition" or "pattern depositing" refers to a process or processes wherein a layer is deposited in a pattern formed by a template such as a mask and can include sputtering, evaporation, or vapor deposition; and "pole" and "write pole" are interchangeable and refer to a magnetic write pole used to record data to media using heat-assisted magnetic recording (HAMR).

The above summary is not intended to describe each disclosed embodiment or every implementation of the present disclosure. The Figures and the detailed description below more particularly exemplify illustrative embodiments.

BRIEF DESCRIPTION OF THE DRAWINGS

Throughout the specification reference is made to the appended drawings, where like reference numerals designate like elements. The figures are not necessarily drawn to scale and should not be construed to contain features that have the illustrated relative shapes or thicknesses. The figures are for illustrative purposes only and are presented only to show the important constituents of the provided articles. In the provided figures.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The present disclosure is generally directed to write heads used in magnetic recording devices such as hard drives. In particular, this disclosure relates to heat-assisted magnetic recording (HAMR), which can be used to increase areal data density of magnetic media. In a HAMR device, information bits are recorded in a storage layer at elevated temperatures in a specially configured magnetic media. The use of heat can overcome superparamagnetic effects that might otherwise limit the areal data density of the media. As such, HAMR devices may include magnetic write heads for delivering electromagnetic energy to heat a small confined media area (spot) at the same time the magnetic write head applies a magnetic field to the media for recording.

One way to achieve a tiny confined hot spot is to use an optical near-field transducer (NFT), such as a plasmonic optical antenna or an aperture, located near an air bearing surface of a hard drive slider. Light may be launched from a light source (e.g., a laser diode) into optics integrated into a slider. An example of such integrated optics includes a waveguide formed from core and cladding layers with high contrast between respective refractive indices. Light propagating in the waveguide may be directed by an optical focusing element, such as a planar solid immersion mirror (PSIM). The PSIM may concentrate the energy into a NFT. The NFT causes the energy to be delivered to the media in a very small spot.

A waveguide, NFT, and PSIM are examples of integrated optical devices that are formed within the slider. The field of integrated optics generally relates to the construction of optics devices on substrates, sometimes in combination with electronic components, to produce functional systems or subsystems. For example, light may be transferred between components via waveguides that are built up on a substrate using layer deposition techniques. These waveguides may be formed as layers of materials, with a middle core layer having a relatively high refractive index (tantalum oxide, for example), and top/bottom cladding layers of relatively low refractive index. Other optical components may be formed in similar fashion, including the NFT and PSIM discussed above.

In a HAMR slider, light is launched into these integrated optics components from a light source such as a laser diode. One way to launch light into a slider is from an externally mounted laser via an optical waveguide or grating coupler fabricated in a slider. Another way is to place a laser light source, such as a laser diode, into the slider, called laser-in-slider (LiS) light delivery. In laser-in-slider configurations, light is launched from the emitting facet of a laser diode into an optical waveguide. Laser-in-slider light delivery can be integrated at a wafer level and may be suitable for mass production.

Figure 1:
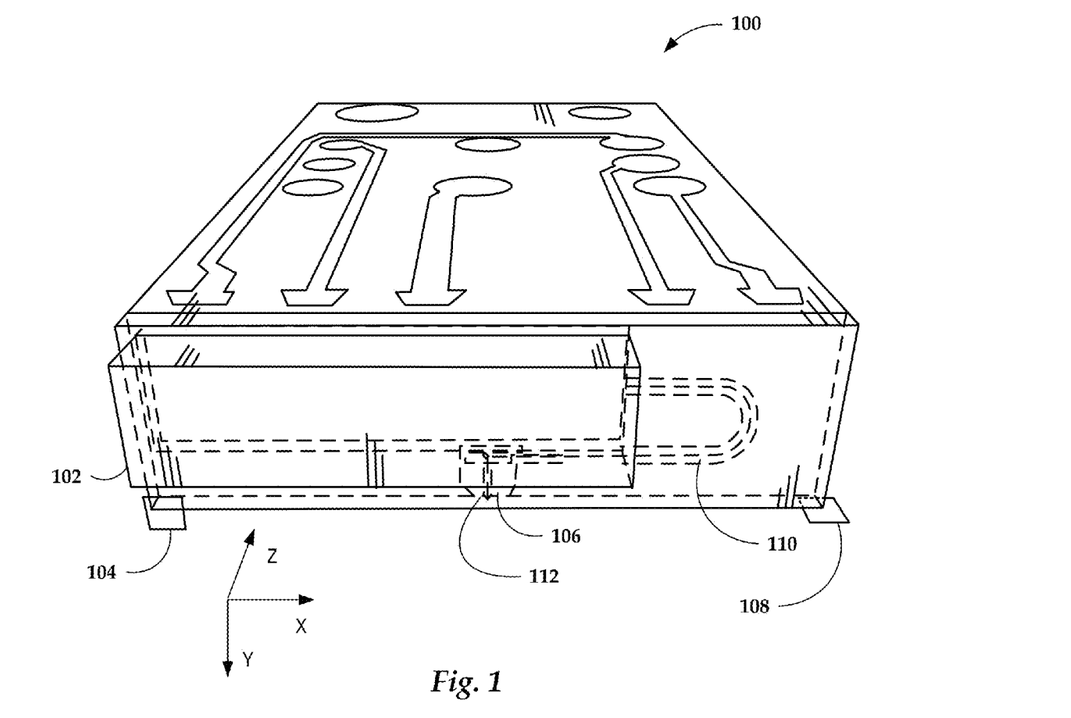
FIG. 1 is a perspective view of a hard drive slider that includes an embodiment of a provided apparatus.

FIG. 1 is a perspective view of a hard drive slider that includes a disclosed near-field transducer. HAMR slider 100 includes laser diode 102 located on top of HAMR slider 100 proximate to trailing edge surface 104 of HAMR slider 100. Laser diode 102 delivers light proximate to write head 106, which has one edge on air bearing surface 108 of HAMR slider 100. Air bearing surface 108 faces and is held proximate to a moving media surface (not shown) during device operation.

Laser diode 102 provides electromagnetic energy to heat the media at a point near to write head 106. Optical coupling components, such as a waveguide 110, are formed integrally within HAMR slider 100 to deliver light from laser diode 102 to the media. In particular, local waveguide 110 and NFT 112 may be located proximate write head 106 to provide local heating of the media during write operations. Laser diode 102 in this example may be an integral, edge emitting device, although it will be appreciated that waveguide 110 and NFT 112 may be used with any light source and light delivery mechanisms. For example, a surface-emitting laser (SEL) may be used instead of an edge firing laser.

While the example in FIG. 1 shows laser diode 102 integrated with HAMR slider 100, NFT 112 discussed herein may be useful in any type of light delivery configuration. For example, in a free-space light delivery configuration, a laser may be mounted externally to the slider, and coupled to the slider by way of optic fibers and/or waveguides. The slider in such an arrangement may include a grating coupler into which light is coupled and delivered to slider-integrated waveguide 110 which energizes NFT 112.

A HAMR device utilizes the types of optical devices described above to heat a magnetic recording media (e.g., hard disk) in order to overcome superparamagnetic effects that limit the areal data density of typical magnetic media. When writing to a HAMR medium, the light can be concentrated into a small hotspot over the track where writing takes place. The light propagates through waveguide 110 where it is coupled to NFT 112 either directly from the waveguide or by way of a focusing element. Other optical elements, such as couplers, mirrors, prisms, etc., may also be formed integral to the slider. The optical elements used in HAMR recording heads are generally referred to as integrated optics devices.

As a result of what is known as the diffraction limit, optical components cannot be used to focus light to a dimension that is less than about half the wavelength of the light. The lasers used in some HAMR designs produce light with wavelengths on the order of 700-1550 nm, yet the desired hot spot is on the order of 50 nm or less. Thus the desired hot spot size is well below half the wavelength of the light. Optical focusers cannot be used to obtain the desired hot spot size, being diffraction limited at this scale. As a result, NFT 112 is employed to create a hotspot on the media.

NFT 112 is a near-field optics device designed to reach local surface plasmon resonance at a designed wavelength. A waveguide and/or other optical element concentrates light on a transducer region (e.g., focal region) where NFT 112 is located. NFT 112 is designed to achieve surface plasmon resonance in response to this concentration of light. At resonance, a high electric field surrounds NFT 112 due to the collective oscillations of electrons at the metal surface. Part of this field will tunnel into a storage medium and get absorbed, thereby raising the temperature of a spot on the media as it being recorded. NFTs generally have a surface that is made of a material that supports surface plasmons such as aluminum, gold, silver, or copper. They may also have other materials but they must have a material that supports surface plasmons on their outer surface.

The distance between NFT 112 and the pole tip of write head 106 ("NPS" or "NFT to pole spacing") is a critical parameter in defining the quality of HAMR recording. The NPS is directly related to the magnetic field at the write position and to the NFT coupling efficiency. Controlling the distance between the NFT and the pole tip of the write head can be a challenge in currently designed HAMR write heads. The widely used sloped write head can have poor control of the NPS. Attempts have been made to improve NPS control such as using a wrap-around etch stop. But this approach can significantly reduce NFT coupling efficiency and cause reliability problems with the head. What is needed is a write head design that can control the NPS but does not harm either the magnetic field or the NFT coupling efficiency.

Typical NFTs that have been used in HAMR applications have an enlarged region that acts as a collector of light emitted from a light source, such as a laser diode, and a peg region that allows the energy from the laser light to be "focused" to a very small spot on the recording media. This spot is much smaller than the diffraction limit due to surface plasmons generated by the near-field transducer.

Figure 2:
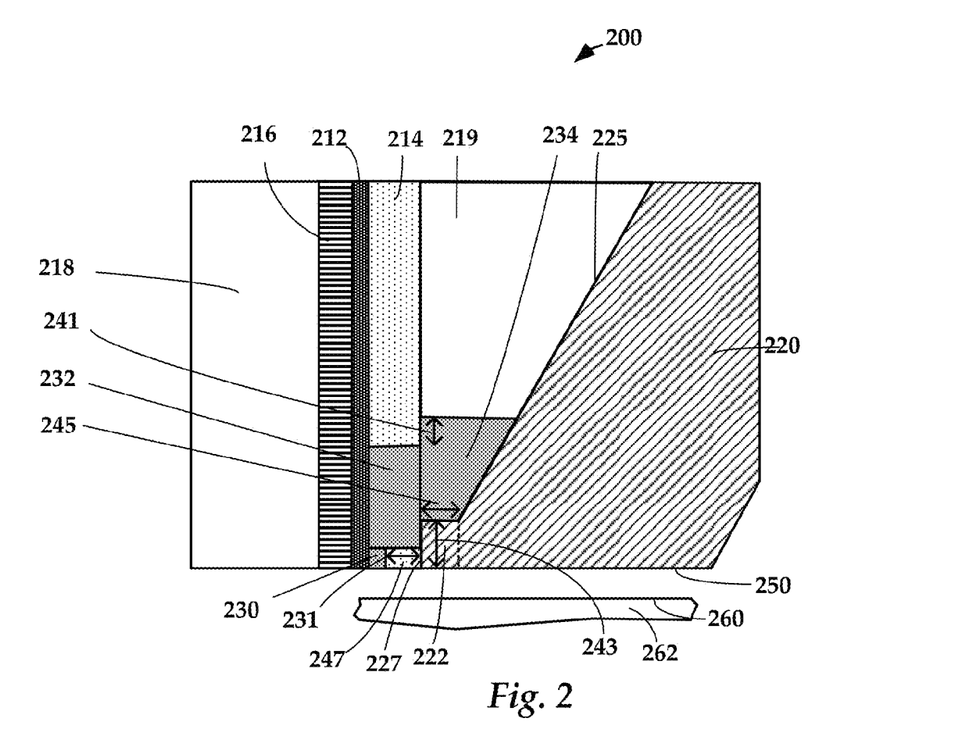
FIG. 2 is a cross section view of an embodiment of a provided apparatus.

FIG. 2 is a cross section view of an embodiment of a provided apparatus. Apparatus 200 for magnetic recording is provided that includes a waveguide adjacent an air bearing surface. The waveguide includes core 216 surrounded by cladding 218. Spacer (core-to-NFT spacing) 212 controls the distance between waveguide core 216 and near-field transducer (peg 231 and disc 232). Waveguide core 216 is surrounded by bottom cladding layer 218 and top cladding layer 219. Apparatus 200 also includes a near-field transducer adjacent the waveguide. The near-field transducer includes peg 230 that has side 231 that is orthogonal to air bearing surface 250. The near-field transducer also includes near-field transducer disc 232, and heat sink 234. In the embodiment shown in FIG. 2, near-field transducer disc 232 and heat sink 234 are disk-shaped as can be seen in the drawings in FIGS. 3A-3M. In the embodiment shown in FIG. 2, peg 230 is in both thermal and electrical contact with near-field transducer disc 232. Heat sink 234 is provided in contact with near-field transducer disc 232. Heat sink 234 is offset from near-field transducer disc 232 by a distance shown as double arrow 241. According to FIG. 2, double arrow 245 is the etch stop length. The write pole is adjacent the waveguide and includes first portion 220 having edge 225 that extends towards air bearing surface 250 at a non-orthogonal angle with respect to the air bearing surface. The write pole also includes second portion 222 that is in contact with first portion 220. Second portion 222 includes side 227 that extends towards and orthogonally contacts air bearing surface 250. Second portion of the write pole defines gap 247 between peg side 231 orthogonal to air bearing surface 250 and side 227 of second portion 222 of the write pole that extends towards and orthogonally contacts air bearing surface 250. Gap 247 can be filled with the same material used to fill the space 214 between spacer 212 and top cladding 219. The provided apparatus can be utilized as a part of a heat-assisted magnetic recording head to record information in proximal magnetic medium 262.

In some embodiments, second portion 222 of the write pole can have a uniform cross-section. Typically, this cross section is rectangular or circular in shape. Second portion 222 (and, typically first portion 220) of the write pole can include a magnetic material. The magnetic material can include a metal or an alloy that includes at least one of iron, cobalt, or nickel. Edge 225 of first portion 220 of the write pole extends towards air bearing surface 250 at a non-orthogonal angle. Generally, the first portion 220 is positioned at an angle with respect to the air bearing surface in the range of from about 15° to about 70°. Typically, the angle can be about 60° (or 30° with respect to the waveguide plane). Gap 247 can be at least partially filled with an insulator (including air) and can extend from about 5 nm to about 100 nm in length along the air bearing surface. Insulators can include dielectric materials and may include metal oxides, metal nitrides, or combinations thereof. Typically, insulators include silica or alumina.

In another aspect, a method is provided for making a magnetic recording head. The method is best described by referring to FIGS. 3A-3M. All items are consistently numbered between FIGS. 3A-3M. Even though the sequence is illustrated herein by FIGS. 3A-3M, this exemplary sequence should not be construed to restrict the provided method to the exact order of the steps provided. The provided method for making a magnetic recording head uses a simple etch stop and a two-portion heat sink made in two steps. A simple etch stop does not wrap magnetic material around the NFT and therefore does not compromise NFT efficiency. Such an arrangement, as will be shown herein, can also boost the write magnetic field that is delivered to the media. Additionally, a two portion heat sink can provide good heat dissipation while controlling the NPS distance.

An embodiment of the provided method for making a magnetic recording head is presented herein using a prophetic example to illustrate the process. Waveguide core layer 312 is deposited upon the substrate. 20-30 nm of core-to-disc spacer layer 314 is deposited upon waveguide core layer 312 to form a substrate-parallel plane. Core-to-disc spacer layer can include metal oxides such as alumina or silica. Waveguide core layer 312 can be a dielectric layer that has a high index of refraction compared to the index of refraction of core-to-disc spacer layer 314. Typically, core-to-disc spacer layer 314 is a material that can act as a cladding surrounding waveguide core layer 312.

Figure 3A:
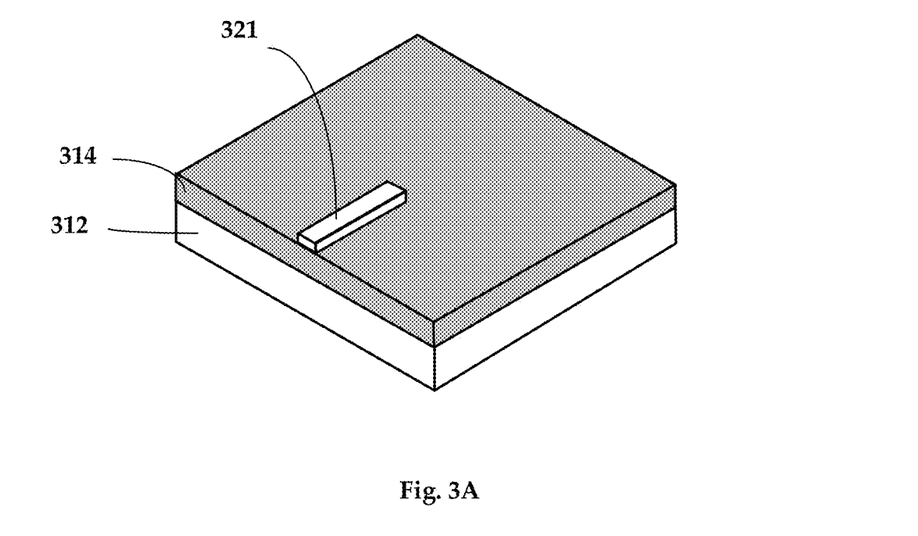
FIGS. 3A-3M are successive perspective views showing a process for making a provided magnetic write head.
Figure 3B:
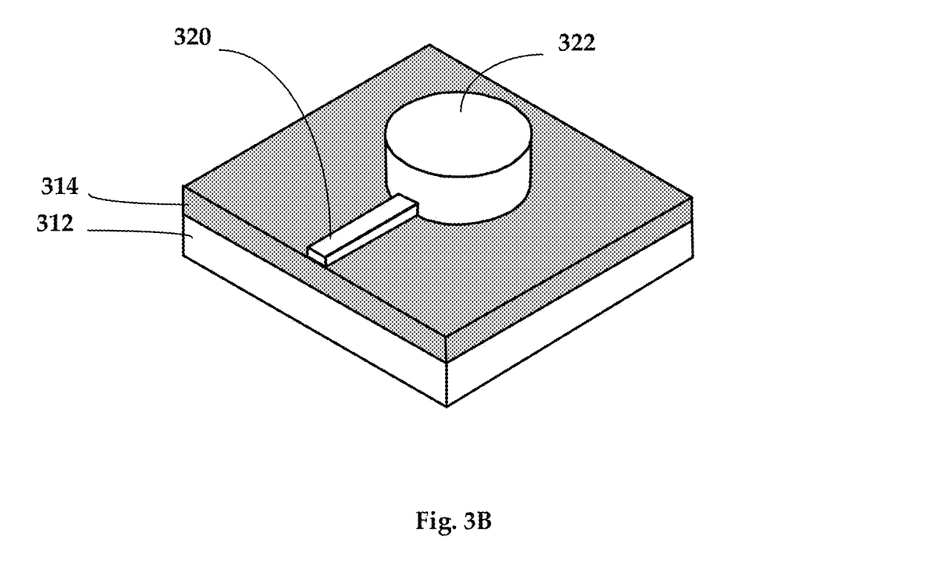

To make a provided magnetic recording head, a near-field transducer peg 321 is formed first with standard process sequence: a) Au deposition; b) photo lithography; c) Au ion beam etch (IBE); and d) photoresist strip.). The resulting structure is shown in FIG. 3A. Subsequently, or simultaneously, near-field transducer disc 322 is also formed upon the substrate-parallel plane using standard liftoff process. Near-field transducer disc 322 is about 100 nm high and 250 nm in diameter and is in the shape of a disk. Near-field transducer disc 322 is made from gold and is pattern deposited over or adjacent and in contact with near-field transducer peg 321. Near-field transducer peg 321 and near-field transducer disc 322 are made of a plasmonic material such as, for example, gold, silver, copper, or alloys thereof. The substrate-parallel plane with near-field transducer peg 321 and near-field transducer disc (disc) 322 is illustrated in FIG. 3B.

Figure 3C:
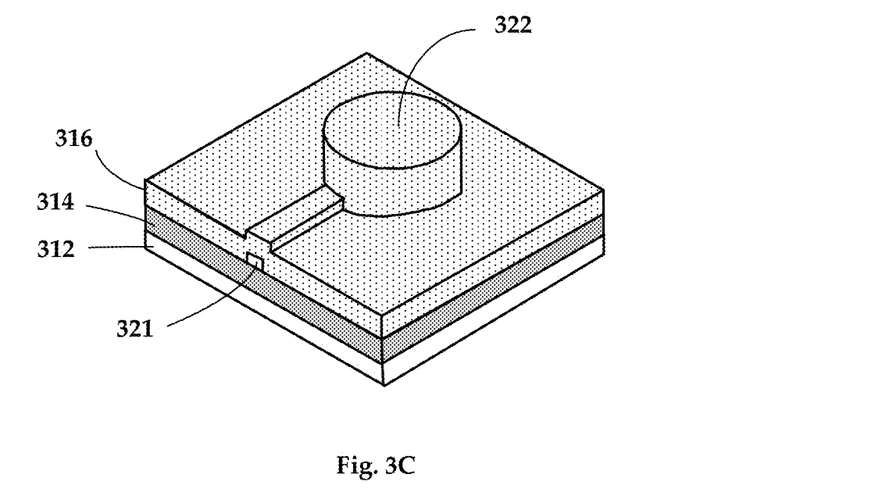

About 50 nm thick of dielectric insulating layer 316 is then blanket deposited over the substrate-parallel plane containing near-field transducer peg 321 and near-field transducer disc 322 as shown in FIG. 3C. Typically, the dielectric insulating layer includes a metal oxide such as alumina or silica. The thickness of dielectric insulating layer 316 is dependent upon the thickness of near-field transducer peg 321 and the desired near-field transducer to write pole spacing (NPS) in the final write head. For example, if the peg thickness is 25 nm and the desired NPS is 30 nm, then the deposited oxide layer should be about 55 nm. FIG. 3C shows the substrate parallel plane with deposited near-field transducer peg 321 and near-field transducer disc 322 blanked covered with metal oxide dielectric insulating layer 316.

Figure 3D:
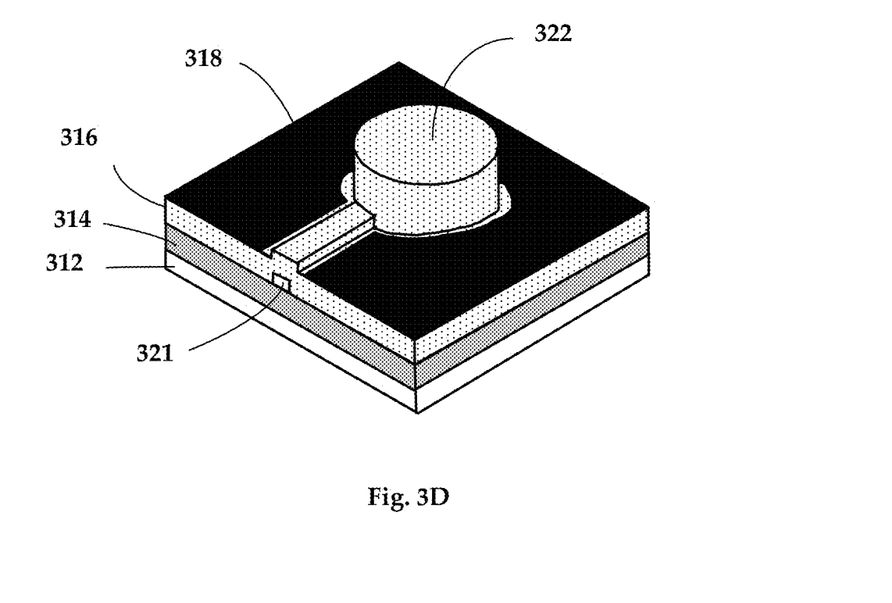
Figure 3E:
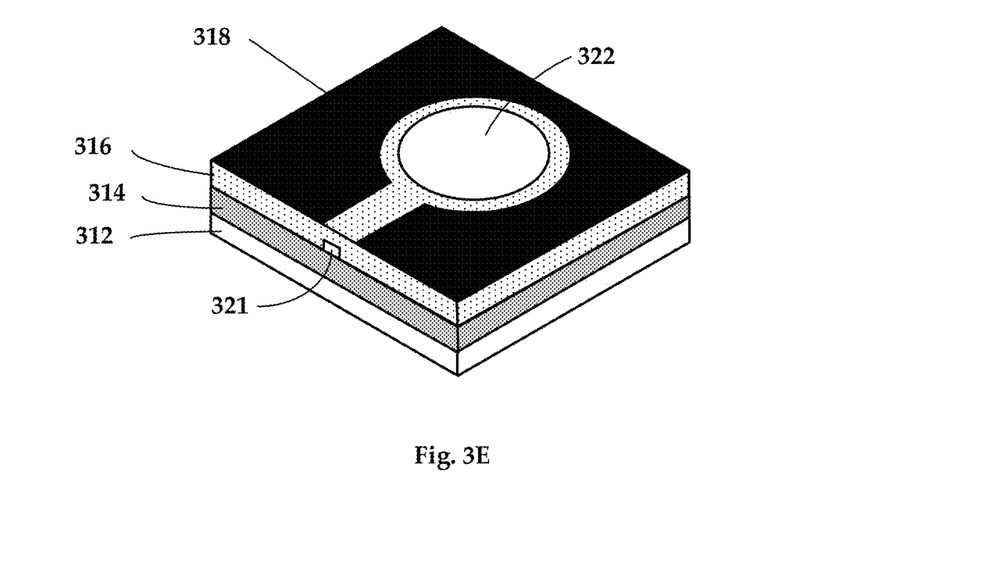
Figure 3F:
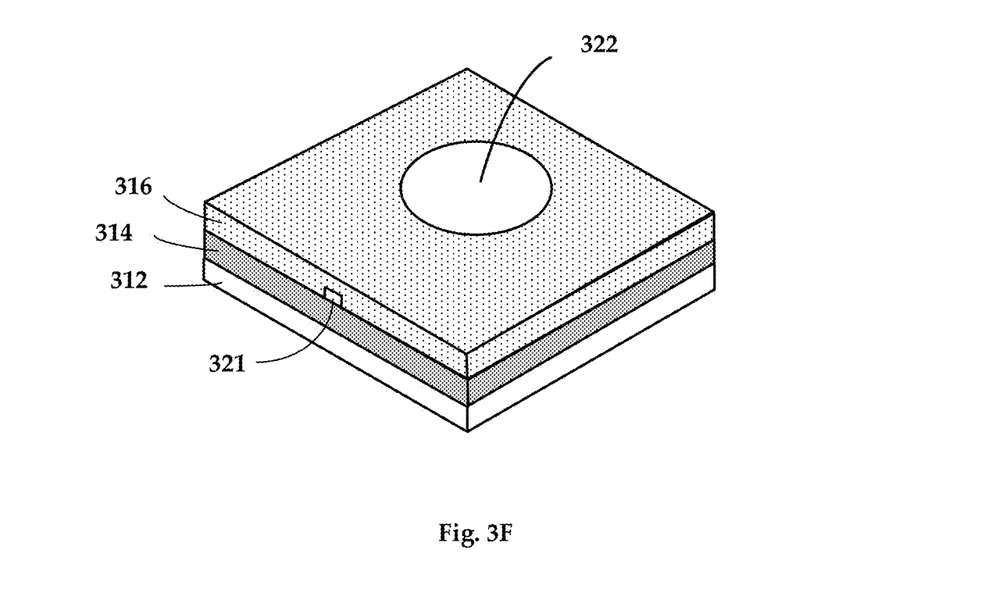

After deposition of insulating layer 316 a 10 to 20 nm thick layer of hard mask 318 is blanket deposited on the substrate from FIG. 3C. Hard mask 318 is made of amorphous carbon and the portion of hard mask 318 covering near-field transducer peg 321 and near-field transducer disc 322 are ashed away using an oxygen plasma as shown in FIG. 3D. The top part of the disc is polished away using chemical mechanical planarization (CMP). The field area is protected by the hard mask during chemical mechanical planarization. The polish rate on the hark mask is very low compared with the polish rate on the oxide dielectric insulating layer. The resulting structure is shown in FIG. 3E. Near-field transducer discs 322 is now exposed and flush with the hard mask surface after insulating layer 316 and excess heat sink material is polished away. At this point, the hard mask layer is ashed away leaving near-field transducer disc 322 having a 50 nm thick disc surrounded by 50 nm of thick dielectric insulating layer (metal oxide) 316 as shown in FIG. 3F. The NPS thickness is defined by the deposition thickness of insulating layer 316 and the amount of planarization (CMP).

Figure 3G:
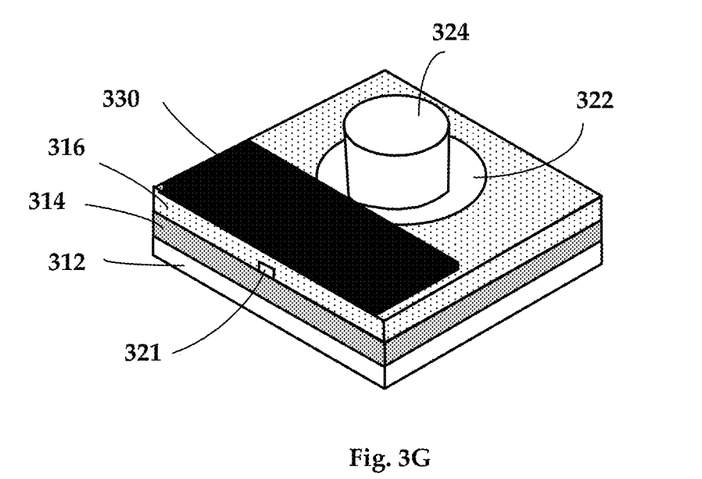
Figure 3H:
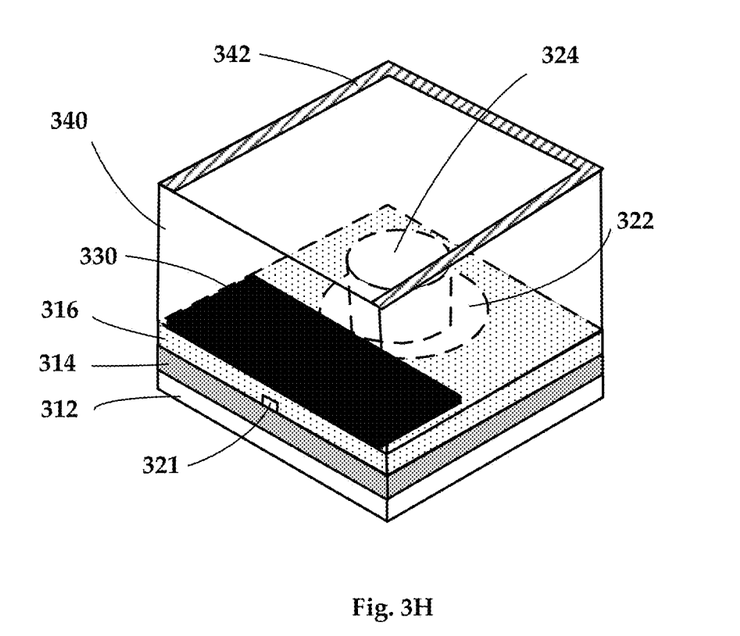
Figure 3I:
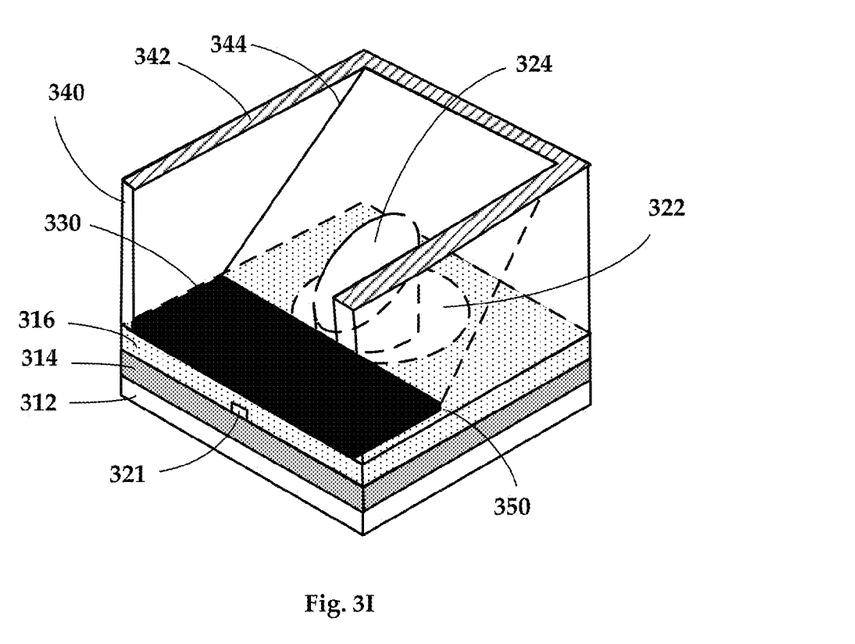
Figure 3J:
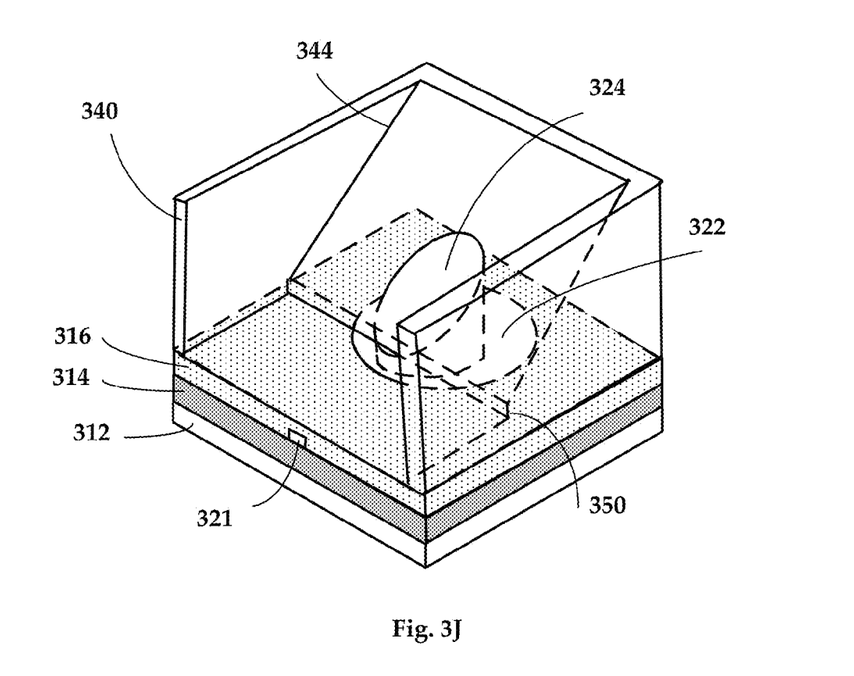

A 50 nm thick slope wall etch stop 330 made of hard mask material (amorphous carbon) is pattern deposited over the dielectric insulating. Etch stop 330 is positioned relative to the edge of near-field transducer disc 322 as shown in FIG. 3G. The position of etch stop 330 defines the final flat distance of the write pole over peg 321. Heat sink disc 324 is then pattern deposited over near-field transducer disc 322 in a liftoff process in which photoresist is patterned first leaving a desired area uncovered (NFT Disc area at this step). Then Au is deposited over the photoresist and also over the open uncovered areas. Finally the Au over the photoresist is lifted off in photoresist solvent, leaving a Au Disc on the wafer. A 600-700 nm thick top cladding layer 340 is sputtered or deposited by plasma-enhanced chemical vapor deposition (PECVD) so that it is on top of and in contact with near-field transducer disc 322, heat sink disc 324, and etch stop 330 as shown in FIG. 3H. Chemical mechanical planarization is, optionally, performed to make the top surface of cladding layer 340 flat. Hard mask 342 (amorphous carbon or chromium) is patterned atop cladding layer 340 to define the slope top edge as shown in FIG. 3H. Top cladding layer 340 is etched using reactive ion beam etching at about a 30 degree angle to produce sloped heat sink 324 and slope layer 344 as shown in FIG. 3J. The top edge of hard mask 342 and the tilting angle of slope 344 are controlled so that etched slope 344 intercepts with side wall 350 of etch stop layer 330.

Hard mask layer 342 and etch stop layer 330 are then removed by oxygen ashing or by wet etching without damaging sloped heat sink 324 as shown in FIG. 3J. A 20 nm thick thin seed layer is blanket deposited over the wafer surface followed by photoresist pattern, then write pole 360, 365, is plated followed by removal of photoresist, and milling away of the seed layer to produce patterned write pole 360, 365 positioned over heat sink 324 and peg 321 of the near-field transducer as shown in FIG. 3K.

Figure 3K:
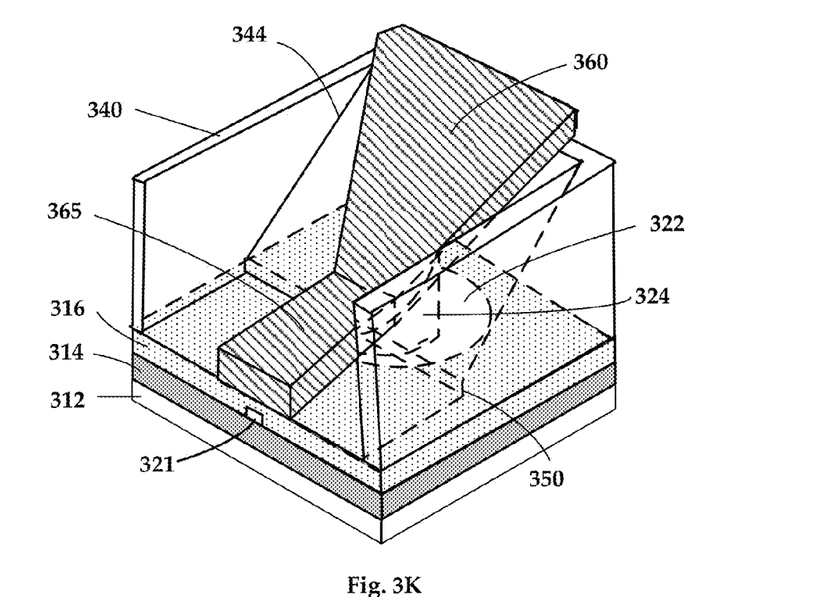
Figure 3L:
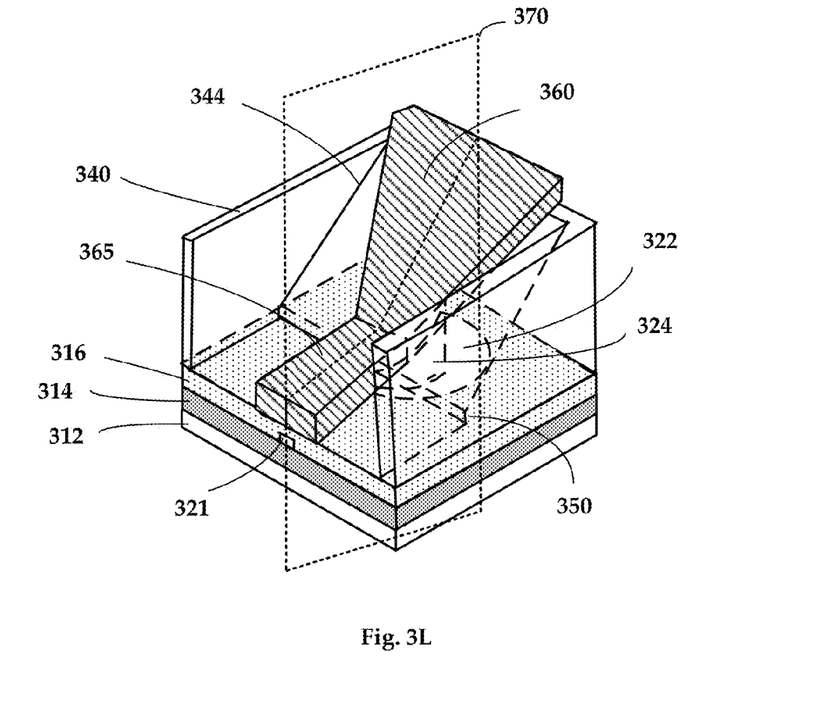
Figure 3M:
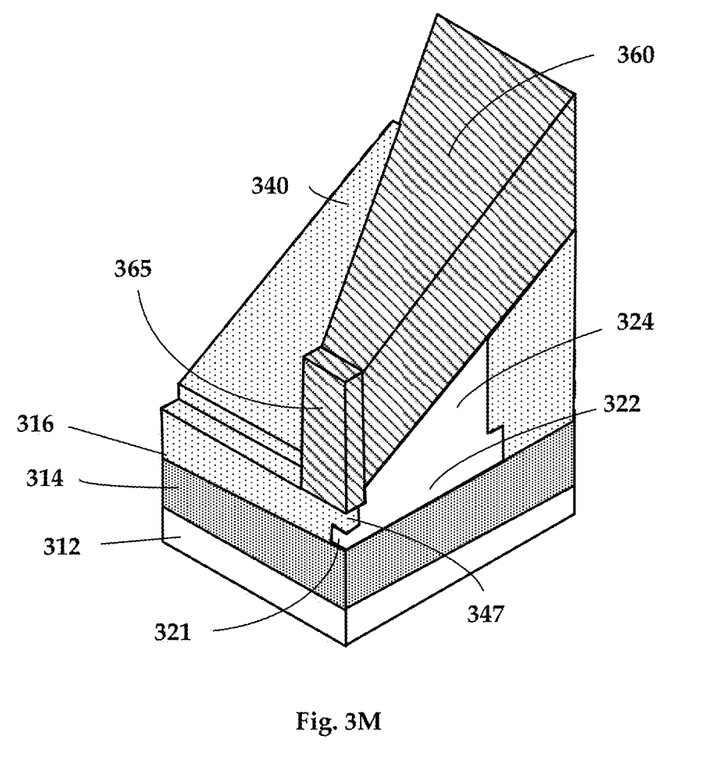

The structure shown in FIG. 3K is the final structure. To better visualize it, a cross section view is formed by cutting (bisecting) along a plane 370 orthogonal to the walls the cladding layer 340 as shown in FIG. 3L. The result is the cross section view of the magnetic write head shown in FIG. 3M that includes waveguide core 312, core-to-disc spacer layer 314, dielectric insulating layer 316 that defines the near-field transducer to write pole spacing. The write pole has two parts—first portion 360 that has an edge that extends towards the air bearing surface (not shown in FIG. 3M but parallel to the front side of the write pole 360, 365) at a non-orthogonal angle with respect to the air bearing surface and second portion 365 that has a side that extends orthogonally towards the air bearing surface and defines gap 347 between peg 321 and second portion 365 of the write pole. Gap 247 between second portion of write pole 365 is formed by insulation layer 316 and near-field transducer peg 321. The near-field transducer to write pole spacing is defined and controlled by planarizing the surface comprising the insulating layer, the near-field transducer peg and near-field transducer disc.

The results presented herein for design of the provided apparatuses and methods are based upon finite element modeling including magnetic modeling, optical modeling and thermal modeling. The modeling results are shown in FIGS. 4-8 (optical results are not shown here but they are used in thermal modeling).

Figure 4:
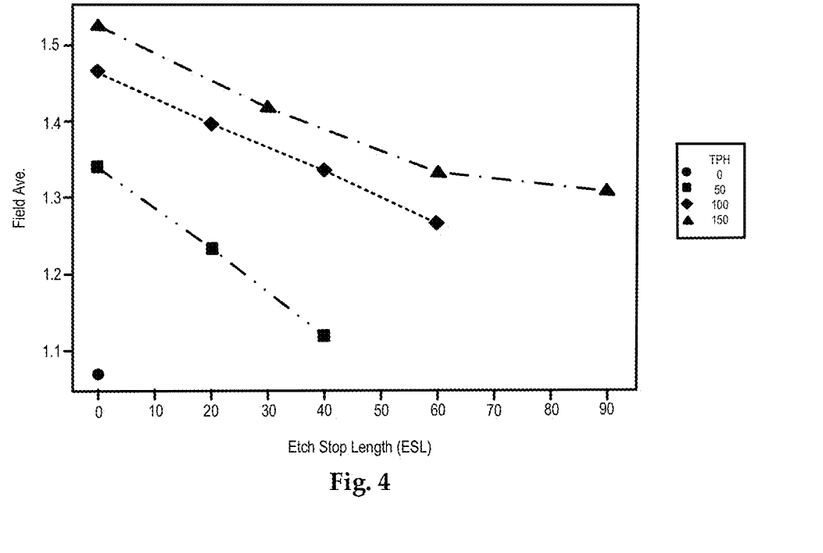
FIG. 4 is a plot of the magnetic field as a function of the etch stop length for models of embodied apparatuses.
Figure 5:
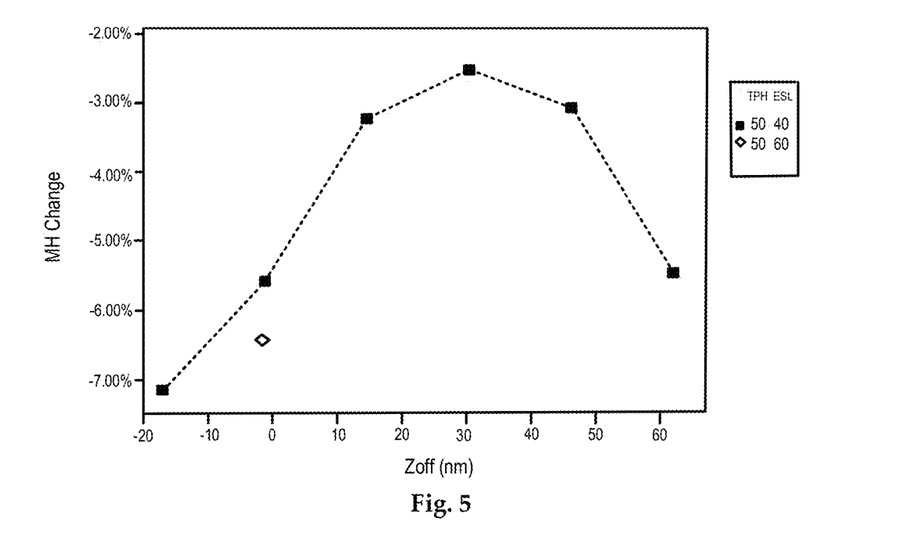
FIG. 5 is a plot of the change of the ratio of the media temperature to the write head temperature (MH ratio) as a function of the offset of the heat sink disc to the near-field transducer disc for models using embodied apparatuses.

FIG. 4 is a plot of the magnetic field as a function of pole tip parameters for models of embodied apparatuses. FIG. 4 is a plot of the magnetic field as a function of etch stop length (ESL, shown as double arrow 245 in FIG. 2). Plots of this function for different top pole heights (TPH, shown as 243 in FIG. 2) are shown in FIG. 4. The value of the magnetic field is the average of several switching events and is the maximum at about 10 nm below the air bearing surface. FIG. 5 shows the change of the ratio of the media temperature to the write head temperature (MH ratio) as a function of the offset of the heat sink disc to the near-field transducer disc (shown as double arrow 241 in FIG. 2), relative to a baseline. MH ratio is a main parameter in write head reliability. Higher MH ratios indicated better write head reliability. FIG. 5 shows that best write head reliability occurs with about 30 nm of offset. Data are shown for top pole heights of 50 nm and etch stop lengths of 40 and 60 nm.

Figure 6:
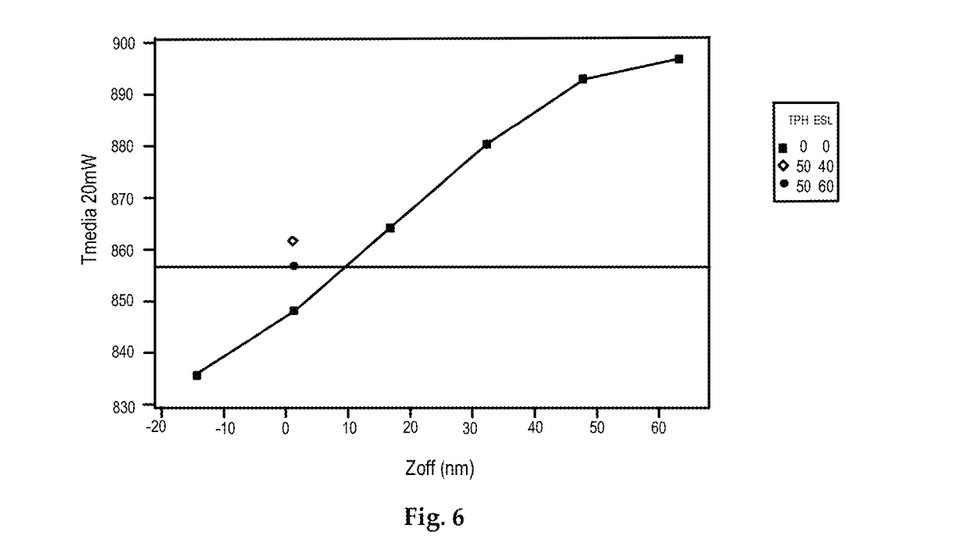
FIG. 6 is a plot of media temperature for 20 mW input power for models using embodied apparatuses.

FIG. 6 is a plot of recording media peak temperature for models using embodied apparatuses. FIG. 6 shows the temperature of the media using a 20 mW laser input power plotted as a function of the same offset shown in FIG. 5. The higher the media temperature the less laser power is required for good head reliability.

Figure 7:
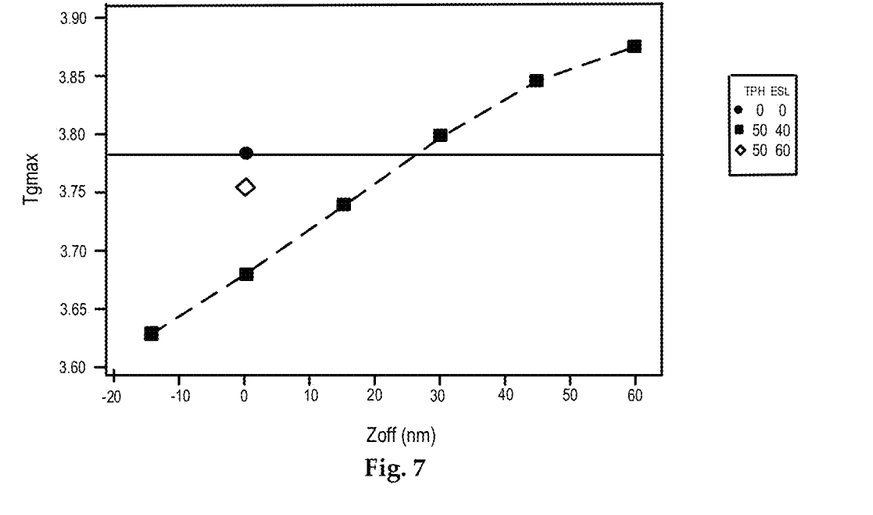
FIG. 7 is a plot of the maximum temperature gradient (Tgmax) for a 450 degree media temperature rise for models using embodied apparatuses.

FIG. 7 is a plot of the maximum temperature gradient (Tgmax) for a 450 degree media temperature rise. A large temperature gradient indicates a sharper transition of the media and the ability to get higher linear density of data. The graph shows the need for an offset in between the heat sink disc and the near-field transducer disc to get better performance.

Figure 8:
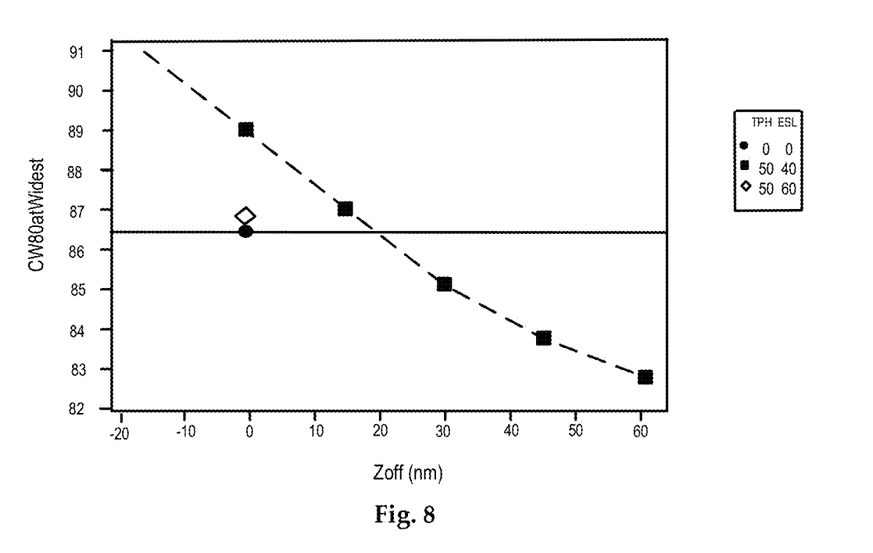
FIG. 8 is a plot of the widest cross track width of the temperature profile at 80% of the peak temperature as a function of the same offset shown in the other figures for models using embodied apparatuses.

FIG. 8 is a plot of the widest cross track width of the temperature profile at 80% of the peak temperature as a function of the same offset shown in the other figures. Smaller values mean higher potential track densities. The linear density and the track density together determine the areal density.

In FIGS. 6-8 a line has been drawn to show the performance of write heads that have no features described in this disclosure (that is, when TPH and ESL are both 0, and when heat sink disk and NFT disk have the same size and material and no offset). This is used as a baseline for designing new write heads. The modeling results shown in FIGS. 4-8 show that choosing an offset (heat sink disc to near-field transducer disc) of about 30 nm gives the best design considering both reliability and areal density. More importantly, the results show that the new design, while having all the benefit of controlling NFT to pole spacing, also has similar—and in some case better reliability and area density performance than the baseline.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof. All references cited within are herein incorporated by reference in their entirety.

What is claimed is:

1. An apparatus comprising:
   a waveguide adjacent an air bearing surface;
   a near-field transducer adjacent the waveguide and comprising a disc and a peg having a side orthogonal to the air bearing surface; and
   a write pole adjacent to the waveguide comprising a first portion having an edge extending towards the air bearing surface at a non-orthogonal angle with respect to the air bearing surface, and a second portion in contact with the first portion comprising a side that extends towards and orthogonally contacts the air bearing surface,
   wherein the second portion defines a gap between the side of the peg orthogonal to the air bearing surface and the side of the second portion of the write pole that extends towards and orthogonally contacts the air bearing surface, wherein the gap is further defined on opposing sides parallel to the air-bearing surface by the disc of the near-field transducer and the air bearing surface.

2. An apparatus according to claim 1, wherein the second portion has a uniform cross-sectional shape.

3. An apparatus according to claim 2, wherein the cross-sectional shape is rectangular.

4. An apparatus according to claim 1, wherein the second portion comprises a magnetic material.

5. An apparatus according to claim 4, wherein the magnetic material comprises a metal or an alloy that includes at least one of iron, cobalt, or nickel.

6. An apparatus according to claim 1, wherein the first portion is positioned at an angle with respect to the air bearing surface in the range of from about 15° to about 70°.

7. An apparatus according to claim 1, wherein the gap is from about 5 nm to about 100 nm in length along the air bearing surface.

8. An apparatus according to claim 1, wherein the gap is at least partially filled with an insulator.

9. An apparatus according to claim 8, wherein the insulator comprises oxides, nitrides, or their compounds.

10. An apparatus according to claim 9, wherein the oxide comprises silica or alumina.

11. A method of making a magnetic recording head comprising:
    pattern depositing a near-field transducer peg and a near-field transducer disc on a substrate-parallel plane,
    wherein the near-field transducer disc is in contact with the near-field transducer peg;
    depositing an insulating layer upon on the substrate-parallel plane,
    wherein the insulating layer covers the near-field transducer peg, and the near-field transducer disc;
    planarizing a surface comprising the insulating layer, the near-field transducer peg and near-field transducer disc;
    pattern depositing an etch stop, then a heat sink and upon the planarized surface, wherein the heat sink is in contact with the near-field transducer disc;
    depositing a slope layer atop and in contact with the heat sink;
    etching the slope layer to produce a sloped heat sink;
    removing the etch stop; and
    patterning a write pole atop and in contact with the sloped heat sink and the insulating layer.

12. A method according to claim 11, wherein the heat sink comprises nanocrystalline diamond.

13. A method according to claim 11, wherein the insulating layer comprises a dielectric material.

14. A method according to claim 13, wherein the dielectric material comprises alumina or silica.

15. A method according to claim 11, wherein the second portion of the write pole comprises a magnetic material that comprises a metal or an alloy that includes at least one of iron, cobalt, or nickel.

16. A method according to claim 11, further comprising applying a hard mask to the insulating layer before pattern depositing a heat sink and an etch stop upon the planarized surface.

17. A method according to claim 16, wherein the hard mask comprises amorphous carbon.

18. A method according to claim 11, further comprising removing the hard mask after planarizing the surface comprising the insulating layer, the near-field transducer peg and near-field transducer disc.

19. A method according to claim 11, wherein a gap having a width between the write pole and the near-field transducer peg is defined by the insulation layer, and wherein the gap width is controlled by planarizing the surface comprising the insulating layer, the near-field transducer peg and near-field transducer disc.

* * * * *